(12) United States Patent
Martin et al.

(10) Patent No.: US 8,488,843 B2
(45) Date of Patent: *Jul. 16, 2013

(54) METHOD FOR AUTOMATICALLY FOLLOWING HAND MOVEMENTS IN AN IMAGE SEQUENCE

(75) Inventors: Lionel Martin, Peynier (FR); Salah Bourennane, Marseilles (FR); Simon Conseil, Plan de Cuques (FR)

(73) Assignees: STMicroelectronics SA, Montrouge (FR); Universite Paul Cezanne Aix-Marseille III, Aix En Provence Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/560,258

(22) Filed: Jul. 27, 2012

(65) Prior Publication Data

US 2012/0294489 A1 Nov. 22, 2012

Related U.S. Application Data

(62) Division of application No. 12/019,584, filed on Jan. 24, 2008, now Pat. No. 8,254,627.

(30) Foreign Application Priority Data

Jan. 25, 2007 (FR) ...................................... 07 00564

(51) Int. Cl.
*G06K 9/00* (2006.01)
(52) U.S. Cl.
USPC ........... 382/103; 382/190; 382/195; 382/201; 382/206; 348/169

(58) Field of Classification Search
USPC ........... 382/103, 190, 195, 201, 206; 348/169
See application file for complete search history.

(56) References Cited

U.S. PATENT DOCUMENTS

| | | | | |
|---|---|---|---|---|
| 5,959,672 A * | 9/1999 | Sasaki | ...................... | 375/240.23 |
| 6,256,400 B1 * | 7/2001 | Takata et al. | .................. | 382/103 |
| 7,496,228 B2 * | 2/2009 | Landwehr et al. | ............ | 382/170 |
| 2002/0181773 A1 * | 12/2002 | Higaki et al. | ................. | 382/190 |
| 2003/0016864 A1 * | 1/2003 | McGee et al. | ................ | 382/165 |
| 2005/0025357 A1 * | 2/2005 | Landwehr et al. | ............ | 382/170 |
| 2006/0280363 A1 * | 12/2006 | Umeda | ......................... | 382/167 |

OTHER PUBLICATIONS

Fujiki et al., "Real-Time 3D Hand Shape Estimation Based on Inverse Kinematics and Physical Constraints," 2005, Image Analysis and Processing—ICIAP 2005 Lecture Notes in Computer Science, vol. 3617, pp. 850-858.*

(Continued)

*Primary Examiner* — John Strege
(74) *Attorney, Agent, or Firm* — Seed IP Law Group PLLC (57) ABSTRACT

A method for following hand movements in an image flow, includes receiving an image flow in real time, locating in each image in the received image flow a hand contour delimiting an image zone of the hand, extracting the postural characteristics from the image zone of the hand located in each image, and determining the hand movements in the image flow from the postural characteristics extracted from each image. The extraction of the postural characteristics of the hand in each image includes locating in the image zone of the hand the center of the palm of the hand by searching for a pixel of the image zone of the hand the furthest from the hand contour.

31 Claims, 2 Drawing Sheets

OTHER PUBLICATIONS

Fujiki, R., et al., "Real-Time 3D Hand Shape Estimation Based on Inverse Kinematics and Physical Constraints," Image Analysis and Processing—ICIAP 2005 Lecture Notes in Computer Science, vol. 3617, pp. 850-858.

Lee, J., et al., "Hand Region Extraction and Gesture Recognition from Video Stream with Complex Background through Entopy Analysis," Proceedings of the 26$^{th}$ Annual International Conference of the IEEE EMBS, San Francisco, CA, Sep. 1-5, 2004, pp. 1513-1516.

Mitcome, A., et al., "A Comparison of Hand Shape Recognition Alogorithms," IEEE, vol. 3, Nov. 29, 2003, pp. 2261-2265.

Tsuruoka, S., et al., "Extraction of Hand Region and Specification of Finger Tips from Color Image," IEEE, Sep. 1997, pp. 206-211.

Xiong, W., et al., "Model-Guided Deformable Hand Shape Recognition without Positioning Aids," Patter Recognition, Elsevier, Kidlington, GB, vol. 38, No. 10, Oct. 2005, pp. 1651-1664.

\* cited by examiner

METHOD FOR AUTOMATICALLY FOLLOWING HAND MOVEMENTS IN AN IMAGE SEQUENCE

CROSS-REFERENCE TO RELATED APPLICATION

This application is a divisional of U.S. patent application Ser. No. 12/019,584, filed Jan. 24, 2008, now pending, which application is incorporated herein by reference in its entirety.

TECHNICAL FIELD

The present disclosure generally relates to image processing and the interfaces enabling a device such as a computer to be controlled.

The present disclosure relates more particularly but not exclusively to following hand movement in real time in an image flow supplied for example by a video camera.

BACKGROUND INFORMATION

To man, hand gestures are a natural and intuitive method of communication to interact with the environment. These gestures can serve to emphasize speech, designate or handle objects, or even constitute a language in its own right, like sign language. The information conveyed by hand gestures proves to be much richer than the information that can be supplied using a keyboard or a pointing device such as a mouse. It is thus desirable to use hand gestures to control a device such as a computer.

Therefore, using electronic gloves equipped with sensors supplying the position of the hand and the angles of the finger joints has already been suggested. However, such gloves prove to be relatively cumbersome and costly due to the number of sensors necessary to determine the position of the fingers.

Furthermore, the regular increase in the power of desktop computers and the emergence of cheap video cameras, enable the production of a real-time hand gesture recognition system, suited to desktop computers, to be considered.

Now, the recognition of hand gestures in a sequence of images initially requires locating the contours of the hand in each image in the sequence. For this purpose, certain methods in prior art require the user to wear a colored glove. However, these methods are very sensitive to luminosity variations, to shadows and to changes in background image. In addition, wearing such a glove proves to be unpleasant for the user.

Secondly, hand gesture recognition requires the postural characteristics of the hand located in each image to be determined, and finally hand movements from one image to the next to be followed from the postural characteristics.

The postural characteristics of the hand can be analyzed for example by positioning a skeletal pattern on the hand. However, this technique requires precisely determining the center of the hand. Classically, the center of the hand is determined by calculating the center of gravity of the region delimited by the contours of the hand, from the geometric torque. If the hand also contains the forearm, the center of gravity calculated will be shifted towards the center of the arm.

Furthermore, hand movements are generally followed using a pattern that is difficult to initialize by making hypotheses about the configuration of the hand.

BRIEF SUMMARY

One or more embodiments overcome all or part of the disadvantages explained above.

One embodiment of a method for following hand movements in an image flow, comprises:
  receiving an image flow in real time,
  locating in each image in the image flow received a hand contour delimiting an image zone of the hand,
  extracting postural characteristics from the image zone of the hand located in each image, and
  determining the hand movements in the image flow from the postural characteristics extracted from each image.

According to one embodiment, the extraction of the postural characteristics of the hand in each image comprises locating in the image zone of the hand the center of the palm of the hand including searching for a pixel of the image zone of the hand the furthest from the hand contour.

According to one embodiment, the location of the center of the palm of the hand comprises applying to the image zone of the hand a distance transform which associates with each pixel of the image zone of the hand the distance from the pixel to the nearest pixel of the hand contour, the center of the palm of the hand being located on the pixel associated with the greatest distance.

According to one embodiment, the postural characteristics of the hand comprise the positions in the image of the fingertips of the hand and of the hollows between each finger, these positions being determined by associating with each pixel of the hand contour the distance between the contour pixel and the pixel of the center of the palm of the hand, the fingertips being located on the hand contour pixels associated with local maxima of variations in the distance with the center of the palm of the hand along the hand contour, and the hollows between the fingers being located on the hand contour pixels associated with local minima of variations in the distance with the center of the palm of the hand along the hand contour.

According to one embodiment, the postural characteristics of the hand comprise the positions in the image of the bases of the fingers of the hand, the base of each finger being positioned in the middle of the segment delimited by the two hollows of the finger.

According to one embodiment, the postural characteristics of the hand comprise the positions in the image of the bases of the fingers of the hand, the base of each finger being positioned:
  by selecting the hollow closest to the fingertip,
  by searching for a point on the hand contour located the closest to the selected hollow, and at the same distance from the fingertip as the selected hollow, and
  by calculating the position of the base of the finger in the middle of the segment delimited by the selected hollow and the point found.

According to one embodiment, the method comprises searching for the thumb among fingers identified by a base and a fingertip, including calculating an angle between a forearm vector linking the position of the center of the palm of the hand to a position of the forearm in the image of the hand, and a vector of each finger linking the base to the fingertip, the thumb being the finger forming the widest angle with the vector of the forearm.

According to one embodiment, the method comprises searching for the thumb among fingers identified by a base and a fingertip, including determining the length or the width of the fingers, the thumb being the shortest or the widest finger.

According to one embodiment, the postural characteristics of the hand comprise the position of the beginning of the forearm which is determined in each image in the image flow by searching for the midpoint of contiguous pixels of the hand contour the furthest from the center of the palm of the hand and from the fingertips.

According to one embodiment, the image zone of the hand in each image in the image flow is located on the basis of the skin color of the hand.

According to one embodiment, a pixel of an image in the image flow belongs to the image zone of the hand if its color components Cb, Cr in the color space YCbCr meet the following relations:

$$77 \leq Cb \leq 127 \text{ and } 133 \leq Cr \leq 173.$$

According to one embodiment, the hand contour in each image in the image flow is refined by calculating a probability that each pixel of the image belongs to the hand or not, and by applying a threshold to the probability to obtain a binary image consisting of pixels belonging to the hand or not.

According to one embodiment, the probability that a pixel i of an image in the image flow belongs to the hand is calculated using the following formula:

$$p(i) = \frac{hskin(i)}{htot(i)}$$

wherein hskin and htot represent the values of 2D chrominance histograms for the chrominance components Cb, Cr of the pixel i, the histogram hskin being established on the image zone of the hand, and htot being established on the entire image.

According to one embodiment, median filtering and connected component labeling are successively applied to the binary image.

According to one embodiment, the location in each image in the received image flow of a hand contour is limited to a reduced search zone in the image, determined according to the position of the hand contour in a previous image in the image flow.

According to one embodiment, the hand movements in the image flow comprise a global movement determined using the displacement of the position of the center of the palm of the hand, and a displacement of each finger of the hand determined by matching each fingertip position between two successive images by minimizing the distance between each fingertip position in the successive images, it only being possible to match each marker once between two successive images.

One embodiment also relates to a device for following hand movements in an image flow, comprising:
  means for acquiring an image flow in real time,
  a location module for locating in each image in the image flow a hand contour delimiting an image zone of the hand,
  an extraction module for extracting postural characteristics from the image zone of the hand located in each image, and
  a following module for determining the hand movements in the image flow from the postural characteristics extracted from each image.

According to one embodiment, the extraction module is configured to determine the position of the center of the palm of the hand in the image zone of the hand, by searching for a pixel of the image zone of the hand the furthest from the hand contour.

According to one embodiment, the extraction module is configured to apply to the image zone of the hand a distance transform which associates with each pixel of the image zone of the hand the distance from the pixel to the closest pixel of the hand contour, the center of the palm of the hand being located on the pixel associated with the greatest distance.

According to one embodiment, the postural characteristics of the hand comprise the positions in the image of the fingertips of the hand and of the hollows between each finger, the extraction module being configured to determine these positions by associating with each pixel of the hand contour the distance between the contour pixel and the pixel of the center of the palm of the hand, the fingertips being located on the hand contour pixels associated with local maxima of variations in the distance with the center of the palm of the hand along the hand contour, and the hollows between the fingers being located on the hand contour pixels associated with local minima of variations in the distance with the center of the palm of the hand along the hand contour.

According to one embodiment, the postural characteristics of the hand comprise the positions in the image of the bases of the fingers of the hand, the extraction module being configured to determine the position of the base of each finger in the image zone of the hand by searching for the middle of the segment delimited by the two hollows of the finger.

According to one embodiment, the postural characteristics of the hand comprise the positions in the image of the bases of the fingers of the hand, the extraction module being configured to determine the position of the base of each finger:
  by selecting the hollow closest to the fingertip,
  by searching for a point on the hand contour located the closest to the selected hollow, and at the same distance from the fingertip as the selected hollow, and
  by calculating the position of the base of the finger in the middle of the segment delimited by the selected hollow and the point found.

According to one embodiment, the extraction module is configured to search for the thumb among fingers identified by a base and a fingertip, by calculating an angle between a forearm vector linking the position of the center of the palm of the hand to a position of the forearm in the image of the hand, and a vector of each finger linking the base to the fingertip, the thumb being the finger forming the widest angle with the vector of the forearm.

According to one embodiment, the extraction module is configured to search for the thumb among fingers identified by a base and a fingertip, comprising determining the length or the thickness of the fingers, the thumb being the longest or the widest finger.

According to one embodiment, the postural characteristics of the hand comprise the position of the beginning of the forearm, the extraction module being configured to determine this position by searching for the midpoint of contiguous pixels of the hand contour the furthest from the center of the palm of the hand and from the fingertips.

According to one embodiment, the location module is configured to locate the image zone of the hand in each image in the image flow on the basis of the skin color of the hand.

According to one embodiment, the location module is configured to refine the hand contour in each image in the image flow by calculating the probability that each pixel of the image belongs to the hand or not, and by applying a threshold to the probability to obtain a binary image comprising pixels belonging to the hand or not.

According to one embodiment, the location module is configured to successively apply median filtering and connected component labeling to the binary image.

According to one embodiment, the location module is configured to locate the hand contour in a reduced search zone determined according to the position of the hand contour in a previous image in the image flow.

According to one embodiment, the hand movement following module is configured to determine a global movement of the hand using the displacement of the position of the center of the palm of the hand, and determining a displacement of each finger of the hand by matching each fingertip position between two successive images by minimizing the distance between each fingertip position in the successive images, it only being possible to match each marker once between two successive images.

BRIEF DESCRIPTION OF THE SEVERAL VIEWS OF THE DRAWINGS

These features shall be presented in greater detail in the following description of one or more embodiments, given in relation with, but not limited to the following figures, in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
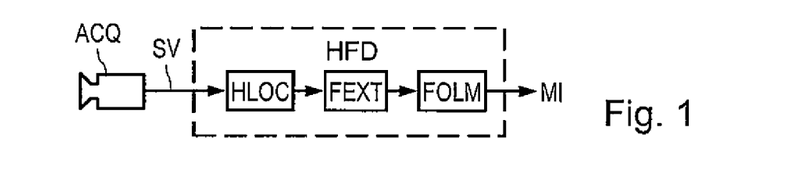
FIG. 1 represents in block form a system for following hand movements according to one embodiment.

FIG. 1 represents a hand following system HFD according to one embodiment. The system HFD comprises an extraction module for extracting the hand contour HLOC receiving in real time a flow of digital images SV from an acquisition system ACQ such as a video camera, an extraction module for extracting the postural characteristics of the hand FEXT, and a hand movement following module FOLM. The module FEXT extracts the postural characteristics of the hand in each contour image supplied by the module HLOC. The module FOLM determines the hand movements between each image from the postural characteristics extracted by the module FEXT and supplies hand movement information MI about hand movement between two successive images.

Figure 2A:
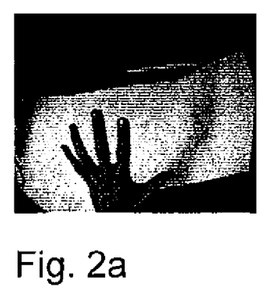
FIGS. 2a, 2b and 2c are images of the hand, showing a method for extracting the contours of the hand in an image according to one embodiment.
Figure 2B:
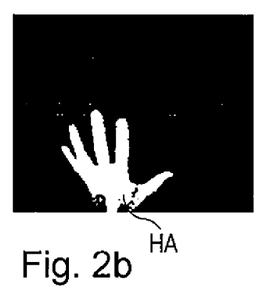
Figure 2C:
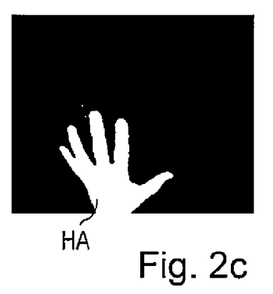
Figure 3A:
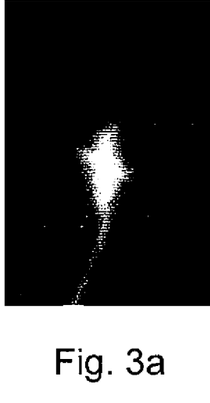
FIGS. 3a, 3b, 3c and 3d are examples of images of distance maps obtained from hand contour images, in accordance with the method according to one embodiment.
Figure 3B:
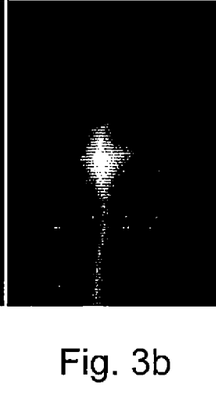
Figure 3C:
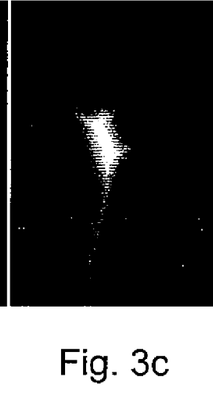
Figure 3D:
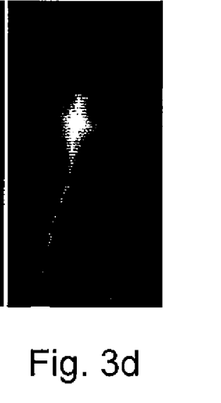

FIGS. 2a to 2c show the processing performed by the module HLOC. Generally, to extract the contours of an object, there are two main categories of methods. In the methods of the first category, extracting the contours of an object comprises performing an image difference between a current image in which the object must be detected and a reference image, or background image or a previous image. These methods assume that the video camera is fixed, and are very sensitive to luminosity variations, to shadows and to background image changes.

In the methods of the second category, an object is detected using the color of the object compared to the colors of the image background. The human skin proves to be well located in certain color spaces. The detection of contours based on the color is therefore commonly used to detect the hands or the face. Therefore, the color components Cb and Cr of the skin are located in the following ranges of values of the color space YCbCr:

$$77 \leq Cb \leq 127 \text{ and } 133 \leq Cr \leq 173 \quad (1)$$

However, the skin color also varies according to the surrounding luminosity. In addition, whatever the category of the method used, if the object to be detected has a color close to that of other objects present in the image, the contours obtained through these methods will integrate the contours of all the objects detected. The methods which only take chrominance into account are thus little efficient.

According to one embodiment, the detection of the contours of the hand in an image is improved by calculating the probability p(i) that each pixel i of each image in the sequence is a pixel of skin or of the image background. This probability can be calculated in the following manner:

$$p(i) = \frac{hskin(i)}{htot(i)} \quad (2)$$

wherein hskin(i) and htot(i) represent the values of 2D chrominance histograms for the chrominance components Cb, Cr of the pixel i, the histogram hskin being established on the zone of the image having a color located in the ranges of color components defined by the relations (1), and htot being established on the entire image. The histograms are advantageously updated periodically in one embodiment so as to take the luminosity variations into account.

The contours of the hand are then determined by applying a threshold to the probability p(i) of each pixel i of the image thus calculated, which enables a binary mask to be obtained, e.g., an image comprising black (=0) or white (=1) pixels. The black pixels (pixels the probability p(i) of which is lower than the threshold) correspond to the background of the image, and the white pixels (pixels the probability p(i) of which is greater than the threshold) correspond to the image zone of the hand HA. The binary mask in FIG. 2b is thus obtained from the image 2a.

Finally, a median filter can be applied to the binary mask to remove noise. In addition, the contours of the hand can be refined by a connected component labeling process enabling the small zones of black pixels in zones of white pixels and the small zones of white pixels in zones of black pixels to be removed. Thus, the image in FIG. 2c is obtained from the binary mask in FIG. 2b.

The duration of the processing for locating the hand contour can be reduced by limiting the calculations described previously to a window of the image in which the hand is assumed to be, given the position of the hand in the previous image and/or of the hand movement during the previous images. For this purpose, the module HLOC predicts a window in which the hand is assumed to be. To do so, it implements the standard Kalman model in one embodiment. The standard Kalman model predicts the status of a system from the previous measurements performed on the latter so as to minimize the prediction error covariance matrix.

The extraction module for extracting the characteristics of the hand FEXT determines the center of the hand in each image (like the one in FIG. 2c) supplied by the module HLOC. Then, the module FEXT determines the configuration of the hand in each image by positioning a simplified skeletal pattern of the hand therein.

According to one embodiment, the center of the hand is determined by searching for the pixel of the image zone of the hand HA the furthest from the hand contour. This operation can be performed by applying a distance transform to the pixels of each image supplied by the module HLOC. The distance transform associates with each pixel of the image (FIG. 2c) the distance from the pixel to the closest black pixel, a black pixel being associated with a zero distance value. This transform enables a grey-scale image of distances like those in FIGS. 3a to 3d to be obtained. The further the pixels of the image in FIG. 2c are from a black pixel, the lighter they are in the images in FIGS. 3a to 3d. Therefore, due to the shape of the hand, the center of the palm is at the location of the pixel of the image of distances having the maximum value.

Figure 4A:
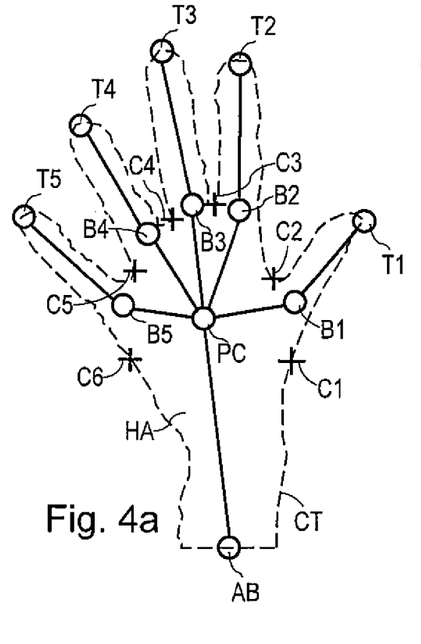
FIGS. 4a, 4b are images of hand contours, showing a method for applying a skeletal pattern to the hand contour according to one embodiment.
Figure 4B:
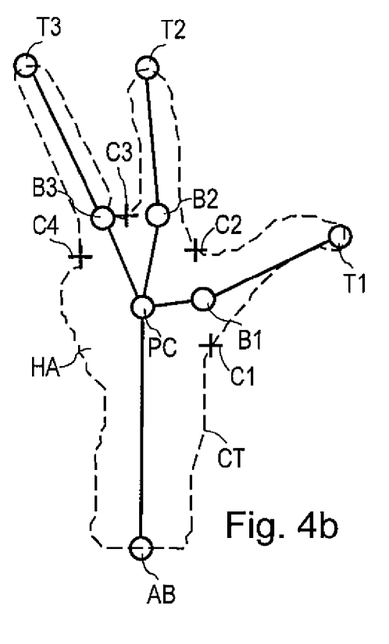

The skeletal pattern of the hand used is represented in FIGS. 4a and 4b. This model comprises markers (marked by circles on FIGS. 4a, 4b) centered on the locations of the center of the palm of the hand PC, joints of the bases of the fingers B1-B5 detected (B1, B2, B3 in FIG. 4b), of the detected fingertips T1-T5 (T1, T2, T3 in FIG. 4b), and of the beginning of the forearm AB. In this skeletal pattern, the marker of the center of the palm of the hand PC is linked by vectors to the marker of the beginning of the forearm AB and to the markers of the bases of the fingers B1-B5 detected. Each finger j (j varying from 1 to 5 in the case in FIG. 4a, and from 1 to 3 in the case in FIG. 4b) comprises a vector linking the marker of its base Bj to the marker of its tip Tj. The positions of the hollows between each finger are also marked on FIGS. 4a, 4b by crosses C1-C6 (C1-C4 in FIG. 4b) each centered on the position of a hollow.

Figure 5:
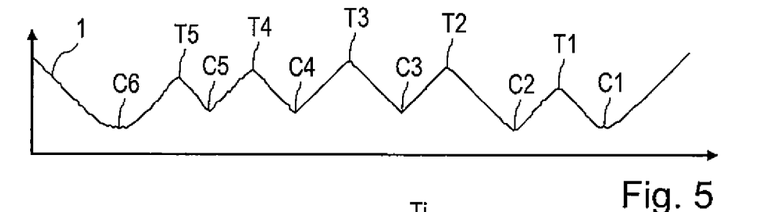
FIG. 5 is an example distance curve of the points of the hand contour with the center of the hand.

The position of the markers of the fingertips T1-T5 and of the hollows between each finger C1-C6 is determined by calculating the distance between each pixel of the hand contour CT and the center of the palm PC. Thus, FIG. 5 represents a curve 1 of variation of this distance along the hand contour CT represented in FIG. 4a. This curve comprises local minima corresponding to the hollows C1-C6 between each finger, and local maxima corresponding to the fingertips T1-T5.

The bases of the fingers B1-B5 are then located in each image using the position of the markers of the hollows C1-C6. For this purpose, the two hollows Cj, Cj+1 of a finger j are identified by searching for the ones closest to a fingertip Tj considered in the image. The bases of the fingers are then positioned in the middle of the segments [Cj, Cj+1]. However, this mode of calculation is not very accurate for certain fingers, and in particular the thumb one of the hollows of which is poorly located.

Figure 6:
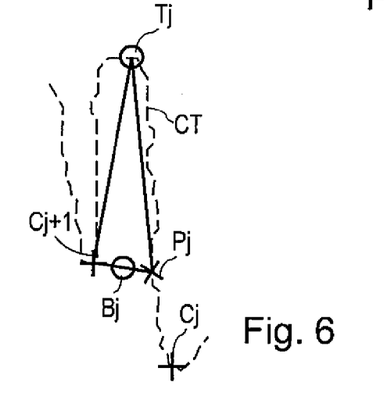
FIG. 6 is a partial view of a contour image showing the determination of the joint of the base of a finger according to one embodiment.

Another embodiment of method for locating the base of a finger is shown by FIG. 6. This method comprises selecting out of the two hollows Cj, Cj+1 closest to a fingertip Tj the one closest to the fingertip, i.e., Cj+1 in the example in FIG. 6. This method then comprises searching for the point Pj of the hand contour CT located the closest to the selected hollow Cj+1, and at the same distance from the fingertip Tj as the selected hollow. The base Bj of the finger is then positioned in the middle of the segment linking the selected hollow Cj+1 to the point found Pj.

The module FEXT then determines which finger corresponds to the thumb. For this purpose, the module FEXT applies a test based on the calculation of the angle between the vector of the forearm PC-AB and the vector of each finger Bj-Tj. The thumb is the finger which has the widest angle between these two vectors. Other criteria for determining the thumb can also be applied alternatively or in combination, like the comparison of the lengths of the fingers, the thumb being the shortest finger, and/or of the thicknesses (or widths) of the fingers, the thumb being the thickest (or the widest) finger. The length of each finger j can be determined by calculating the distance Bj-Tj between the markers of the base and of the fingertip. The width of each finger can for example be obtained by calculating the distance between the points of the hand contour CT the closest to a midpoint of the segment Bj-Tj, or an average value of this distance along the segment Bj-Tj.

It shall be noted that if the fingers are squeezed up against one another, the hollows Cj between the fingers will be very close to the fingertips Tj. Therefore, the bases of the fingers Bj will also be very close to the fingertips. A single finger vector will be positioned in the image if the hollows of the fingers are not located.

The position of the marker of the beginning of the forearm AB is determined by searching for the midpoint of contiguous pixels the furthest from the point PC and the fingertips Tj using, as applicable, the position of the marker AB in the previous images in the event that the fist is clenched. In the event that the contours of the hand extend to the edge of the image, the marker AB is located in the middle of the contour pixels of the image belonging to the hand contour (case in FIGS. 2c, 4a, 4b).

The hand movement following module FOLM uses the skeletal pattern of the hand described previously, positioned in each image by the module FEXT. The global movement of the hand between two successive images is determined using the displacement of the markers PC and AB from one image to the next. This global movement also supplies an estimation of the position of the fingers. The displacement of the fingers is then estimated by matching each finger marker Bj, Tj from one image to the next. This matching is performed by minimizing the euclidean distance between each finger marker in the successive images, it only being possible to match each marker once between two successive images. When the markers of a finger in an image do not correspond to any finger marker in the previous image, a new finger is created. When the markers of a finger in an image do not correspond to any finger marker in the next image, the finger is removed. The position of the finger removed is saved for a few images in the image sequence SV in the event that the disappearance of the finger is temporary (obstruction, or detection error).

The module FOLM supplies movement information MI comprising a vector of displacement between two successive images for each marker PC, AB, B1-B5 and T1-T5 of the skeletal pattern.

Thanks to the application of a simplified skeletal pattern (location of the markers characteristic of the hand PC, AB, T1-T5, B1-B5), the method according to one embodiment enables the movements of a hand observed by a video camera to be followed simply and efficiently. Thus, the necessary calculation time is very short. The hand can therefore be followed according to one embodiment in real time by a computer of standard PC type connected to a cheap video camera such as a webcam.

The center of the hand PC is located in accordance with the method according to one embodiment whether or not the user's arm is bare. The points characteristic of the hand are located without the need to make an assumption about the entry zone of the hand and irrespective of the position and orientation of the hand in the image.

One or more embodiments can be applied to the dynamic recognition of gestures, and in particular but not exclusively to the precise location of the fingertip and of the direction of the index finger to produce a device control interface.

Various alternative embodiments and applications of the embodiments may be made. In particular but not exclusively, the embodiment(s) is not limited to a location of the contours of the hand based on the color. This location can also be performed by a difference with the background of the image, even if this method is less efficient.

The postural characteristics of the hand can also be determined in other ways than by locating points characteristic of the hand enabling a skeletal pattern to be reconstituted. Therefore, the postural characteristics of the hand can comprise searching for a hand contour close to the one extracted in a library of contours. The postural characteristics of the hand can also be limited to the position of the center of the hand, and possibly of the marker of the forearm AB. The embodiment(s) of the method for determining hand movements to be applied depends on the manner in which the postural characteristics of the hand are defined.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A device, comprising:
a memory; and
one or more processing devices configured to implement:
a location module configured to locate in images of an image flow hand contours that delimit hand image zones;
an extraction module coupled to said location module and configured to extract postural characteristics from delimited hand image zones of images of the image flow; and
a following module coupled to said extraction module and configured to determine hand movements in the image flow from postural characteristics extracted by the extraction module, wherein the extraction module is configured to identify a pixel furthest from a hand contour of an image and determine a position of a center of a palm of a hand in an image zone based on the identified pixel.

2. The device according to claim 1 wherein the extraction module is configured to apply to the image zone of the hand a distance transform which associates with each pixel of the image zone of the hand a distance from the pixel to the closest pixel of the hand contour, the center of the palm of the hand being located on a pixel associated with a greatest distance.

3. The device according to claim 1 wherein the postural characteristics include positions in the image of fingertips and of hollows between fingers, the extraction module being configured to determine these positions by associating with each pixel of the hand contour a distance between a contour pixel and the pixel of the center of the palm of the hand, the fingertips being located on the hand contour pixels associated with local maxima of variations in a distance with the center of the palm of the hand along the hand contour, and the hollows between the fingers being located on the hand contour pixels associated with local minima of variations in the distance with the center of the palm of the hand along the hand contour.

4. The device according to claim 3 wherein the postural characteristics include positions in the image of bases of the fingers of the hand, the extraction module being configured to determine a position of the base of each finger in the image zone of the hand by a search for a middle of a segment delimited by two hollows of the finger.

5. The device according to claim 3 wherein the postural characteristics include positions in the image of bases of the fingers of the hand, the extraction module being configured to determine the position of a base of each finger by:
selecting a hollow closest to a fingertip;
searching for a point on the hand contour located closest to the selected hollow, and at a same distance from the fingertip as the selected hollow; and
calculating a position of the base of the finger in a middle of a segment delimited by the selected hollow and the point found.

6. The device according to claim 4 wherein the extraction module is configured to search for a thumb among fingers identified by a base and a fingertip, by calculation of an angle between a forearm vector linking a position of the center of the palm of the hand to a position of a forearm in the image of the hand, and a vector of each finger linking a base to the fingertip, the thumb being a finger forming a widest angle with the forearm vector.

7. The device according to claim 4 wherein the extraction module is configured to search for a thumb among fingers identified by a base and a fingertip, by determination of a length or a thickness of the fingers, the thumb being a longest or a widest finger.

8. The device according to claim 1 wherein the postural characteristics include a position of a beginning of a forearm, the extraction module being configured to determine this position by a search for a midpoint of contiguous pixels of the hand contour furthest from the center of the palm of the hand and from fingertips.

9. The device according to claim 1 wherein the location module is configured to locate image zones in each image in the image flow based on skin color.

10. The device according to claim 9 wherein a pixel of an image in the image flow belongs to the image zone of the hand if its color components Cb, Cr in a color space YCbCr meet relations:

$$77 \leq Cb \leq 127 \text{ and } 133 \leq Cr \leq 173.$$

11. The device according to claim 9 wherein the location module is configured to refine the hand contour in each image in the image flow by calculation of a probability that each pixel of the image belongs to the hand or not, and by application of a threshold to the probability to obtain a binary image having pixels belonging to the hand or not.

12. The device according to claim 11 wherein the probability that a pixel i of an image in the image flow belongs to the hand is calculated using:

$$p(i) = \frac{hskin(i)}{htot(i)}$$

wherein hskin(i) and htot(i) represent values of 2D chrominance histograms for chrominance components Cb, Cr of the pixel i, the histogram hskin being established on the image zone of the hand, and htot being established on the image in its entirety.

13. The device according to claim 11 wherein the location module is configured to successively apply median filtering and connected component labeling to the binary image.

14. The device according to claim 1 wherein the location module is configured to locate hand contours in a reduced search zone determined according to a position of a hand contour in a previous image in the image flow.

15. The device according to claim 3 wherein the following module is configured to determine a global movement of the hand using a displacement of a position of the center of the palm of the hand, and to determine a displacement of each finger of the hand by matching each fingertip position between two successive images by minimizing a distance between each fingertip position in the successive images, each marker being possible to match only once between two successive images.

16. The device of claim 1, further comprising a video camera configured to acquire the image flow.

17. A system, comprising:
an image sensor configured to acquire image flows;
a control device configured to generate control signals from image flows, the device including:
location logic configured to locate in images of image flows hand contours that delimit hand image zones;
extraction logic coupled to said location logic and configured to extract postural characteristics from delimited hand image zones of images of image flows; and
following logic coupled to said extraction logic and configured to determine hand movements in image flows from postural characteristics extracted by the extraction logic, wherein the extraction logic is configured to identify a pixel furthest from a hand contour of an image and determine a position of a center of a palm of a hand in an image zone of the image based on the identified pixel.

18. The system of claim 17 wherein the extraction logic is configured to apply a distance transform which associates with each pixel of the image zone a distance from the pixel to the closest pixel of the hand contour, the center of the palm of the hand being located on a pixel associated with a greatest distance.

19. The system of claim 17 wherein the postural characteristics include positions of fingertips and of hollows between fingers, the extraction logic being configured to determine these positions by associating with each pixel of the hand contour a distance between a contour pixel and the pixel of the center of the palm of the hand, the fingertips being located on the hand contour pixels associated with local maxima of variations in a distance with the center of the palm of the hand along the hand contour, and the hollows between the fingers being located on the hand contour pixels associated with local minima of variations in the distance with the center of the palm of the hand along the hand contour.

20. The system of claim 19 wherein the postural characteristics include positions in the image of bases of the fingers of the hand, the extraction logic being configured to determine a position of the base of each finger in the image zone of the hand by a search for a middle of a segment delimited by two hollows of the finger.

21. The system of claim 20 wherein the extraction logic is configured to search for a thumb among fingers identified by a base and a fingertip, by calculation of an angle between a forearm vector linking a position of the center of the palm of the hand to a position of a forearm in the image of the hand, and a vector of each finger linking a base to the fingertip, the thumb being a finger forming a widest angle with the forearm vector.

22. The system of claim 20 wherein the extraction logic is configured to search for a thumb among fingers identified by a base and a fingertip, by determining a length or a thickness of the fingers, the thumb being a longest or a widest finger.

23. The system of claim 17, further comprising a computing system configured to receive the control signals.

24. The system of claim 23 wherein the control signals are based on determined hand movements.

25. A method, comprising:
receiving an image flow in real time;
locating in each image in the received image flow a hand contour delimiting an image zone of a hand;
extracting postural characteristics from the image zone of the hand located in each image; and
determining hand movements in the image flow from the postural characteristics extracted from each image,
wherein the extracting the postural characteristics of the hand in each image includes locating in the image zone of the hand a center of a palm of the hand by searching for a pixel of the image zone of the hand that is furthest from the hand contour, the locating, the extracting and the determining being performed by one or more configured processing devices.

26. The method of claim 25 wherein locating the center of the palm of the hand comprises determining distances of pixels of the image zone of the hand to a nearest pixel of the hand contour, the center of the palm of the hand being located on the pixel associated with a greatest distance.

27. The method of claim 25 wherein the postural characteristics of the hand include positions in the image of bases of fingers of the hand, a base of each finger being positioned by:
selecting a hollow closest to a fingertip;
searching for a point on the hand contour located closest to the selected hollow, and at a same distance from the fingertip as the selected hollow; and
calculating a position of the base of the finger in a middle of a segment delimited by the selected hollow and the point found.

28. The method of claim 25 wherein the postural characteristics of the hand include a position of a beginning of a forearm which is determined in each image in the image flow by searching for a midpoint of contiguous pixels of the hand contour furthest from the center of the palm of the hand and from fingertips.

29. The method of claim 25 wherein a pixel of an image in the image flow belongs to the image zone of the hand if its color components Cb, Cr in a color space YCbCr meet relations:

$$77 \leq Cb \leq 127 \text{ and } 133 \leq Cr \leq 173.$$

30. The method of claim 29 wherein a probability that a pixel i of an image in the image flow belongs to the hand is calculated using:

$$p(i) = \frac{hskin(i)}{htot(i)}$$

wherein hskin(i) and htot(i) represent values of 2D chrominance histograms for chrominance components Cb, Cr of the pixel i, the histogram hskin being established on the image zone of the hand, and htot being established on the image in its entirety.

31. The method of claim 25, further comprising:
controlling a computing system based on the determined hand movements.

* * * * *